(12) United States Patent
Ichihara et al.

(10) Patent No.: US 8,728,347 B2
(45) Date of Patent: May 20, 2014

(54) OXYGEN ABSORBER, OXYGEN ABSORBENT RESIN COMPOSITION, AND OXYGEN ABSORBENT FILM

(75) Inventors: Junko Ichihara, Osaka (JP); Natsuki Sakamoto, Tokyo (JP); Yumiko Hagio, Tokyo (JP); Tatsuya Ogawa, Tokyo (JP)

(73) Assignee: Kyodo Printing Co., Ltd., Tokyo (JP)

( * ) Notice: Subject to any disclaimer, the term of this patent is extended or adjusted under 35 U.S.C. 154(b) by 580 days.

(21) Appl. No.: 12/894,037

(22) Filed: Sep. 29, 2010

(65) Prior Publication Data

US 2011/0077149 A1 Mar. 31, 2011

(30) Foreign Application Priority Data

Sep. 30, 2009 (JP) ................................ 2009-228541
Apr. 28, 2010 (JP) ................................ 2010-104386

(51) Int. Cl.
*C09K 3/00* (2006.01)
*C07C 65/03* (2006.01)
*B01D 53/14* (2006.01)

(52) U.S. Cl.
USPC ............................ 252/184; 562/476; 423/219

(58) Field of Classification Search
USPC ............................ 423/219; 252/184; 562/476
See application file for complete search history.

(56) References Cited

U.S. PATENT DOCUMENTS

| 4,908,185 A | 3/1990 | Plough, Jr. |
| 2006/0163534 A1 | 7/2006 | Sugimoto et al. |
| 2009/0159846 A1 | 6/2009 | Sugimoto et al. |

FOREIGN PATENT DOCUMENTS

| EP | 1 550 506 A1 | 7/2005 | | |
| EP | 1 938 892 A1 | 7/2008 | | |
| JP | 08-024639 A | 1/1996 | | |
| JP | 08-057307 A | 3/1996 | | |
| JP | H08-057307 | * 3/1996 | ............... | B01J 20/22 |
| JP | H08-309181 A | 11/1996 | | |
| JP | 10-015385 A | 1/1998 | | |
| JP | 2001-009273 A | 1/2001 | | |
| JP | 2001-105540 A | 4/2001 | | |

OTHER PUBLICATIONS

W.P. (translator), "A Booke of Secrets[ . . . ]" (excerpts) London, Edward White (1596). Viewed Apr. 9, 2013 at http://www.english.cam.ac.uk/ceres/ehoc/intro/inkrecipes.html.*
Stijnman, Ad, "Iron gall ink—Historic ink recipes." Rijkdienst voor het Cultureel Erfgoed (1998). Viewed Apr. 9, 2013 at http://www.irongallink.org/igi/igi-historic-recipes.*
Eusman, Elmer, "Iron gall ink—Ingredients." Rijkdienst voor het Cultureel Erfgoed (1998). Viewed Apr. 9, 2013 at http://www.irongallink.org/igi/igi-ingredients.*
Korean Office Action dated Mar. 28, 2012, in a counterpart Korean patent application No. 10-2010-0095133. (Concise explanation of relevance: This Korean Office Action rejects claims in the Korean application in view of Foreign Patent document No. 1 and JP H08-024639 which has been submitted in a previous IDS.).
European Search Report dated Jan. 31, 2011, in a counterpart European patent application No. 10180037.3 for Examiner consideration, citing U.S. Patent Application Publication Nos. 1-2 and Foreign Patent document Nos. 1-2 listed above, and JP8-057307, JP10-015385, and JP8-024639, which have been submitted in a previous IDS.
Japanese Office Action dated Jul. 23, 2013, in a counterpart Japanese patent application No. 2010-104386. (Concise explanation of relevance: The Japanese Office Action rejects claims in the Japanese application in view of Foreign Patent document No. 1 above and JPH08-57307 and JP2001-9273 which have been submitted in previous IDSs.).

* cited by examiner

*Primary Examiner* — Stuart Hendrickson
*Assistant Examiner* — Daniel Berns
(74) *Attorney, Agent, or Firm* — Chen Yoshimura LLP

(57) ABSTRACT

The oxygen absorber of the present invention contains gallic acid and a transition metal compound; in addition, it may contain an alkali carbonate whereby the oxygen absorbent provides safety and the same oxygen absorption capability as the oxygen absorber using iron powder.

7 Claims, No Drawings

OXYGEN ABSORBER, OXYGEN ABSORBENT RESIN COMPOSITION, AND OXYGEN ABSORBENT FILM

This application claims the benefit of the Japanese Patent Applications No. 2009-228541, filed on Sep. 30, 2009 and No. 2010-104386, filed on Apr. 28, 2010.

BACKGROUND OF THE INVENTION

1. Technical Field

The present invention relates to oxygen absorber, oxygen absorbent resin composition, and oxygen absorbent film used preferably for foods, medicines, pharmaceuticals, cosmetics, electronic parts, and so on.

2. Background Art

Oxygen absorbers are contained in packages for foods, medicines, pharmaceuticals, cosmetics, electronic parts, and so on. Oxygen absorbers containing iron powder or an organic compound as a reactant are known. Of those, the ones containing iron powder as reactant are used widely in view of cost and oxygen absorption capability. However, it has been pointed out that the oxygen absorbers containing iron powder as a reactant have the following disadvantages: (1) being detected by a metal detector using in packaging line of foods, medicines, pharmaceuticals, cosmetics, electronic parts, and so on to examine a foreign body, and (2) a package containing the oxygen absorbers should not be heated in a microwave oven because ignition may result.

For oxygen absorbers containing an organic chemical as a reactant, those using ascorbic acid and gallic acid are known.

The oxygen absorber containing ascorbic acid as a reactant, which absorbs oxygen relying on the oxidation of ascorbic acid, is low in oxygen absorption capability and slow in absorption speed compared with those containing iron powder as a reactant. To increase the oxygen absorption speed of ascorbic acid, a composition containing gallic acid and metallic salt compounds, with a porphyrin metal complex added as a catalyst, was suggested (JP1996-57307A).

Meanwhile, the oxygen absorber using gallic acid as a reactant also requires an alkaline compound and water as its ingredients because it relies on the mechanism in which the hydrogen of the hydroxyl group and the carboxyl group of the gallic acid are dissociated under the existence of the alkaline compound and water, and then the dissociated hydrogen reacts with oxygen (JP1996-24639A and JP1998-15385A). Since the oxygen absorber using gallic acid as a reactant requires water as its ingredient as described above, it is not suitable for use in dried foods, medicines, pharmaceuticals, cosmetics, and electronic parts.

SUMMARY OF THE INVENTION

Problems to be Resolved

As described above, the oxygen absorber using an organic substance as a reactant has a problem that its oxygen absorption capability is lower than that of the oxygen absorber using iron powder as a reactant. Meanwhile, the traditional oxygen absorber using gallic acid as a reactant requires water to cause oxygen-absorbent reaction. Consequently it is not practical to use it for dry cattle products such as salami and beef jerky, dry sea foods such as dried fishes, medicine, pharmaceuticals, cosmetics, and electronic parts. In addition, since this oxygen absorber is kneaded into a resin by adding water, it is difficult to form a thoroughly blended oxygen absorbent resin composition. Even if thorough blending is possible, it takes time and is inefficient. In addition, as reaction progresses, the oxygen absorption capability may decrease. It should be realized that it is difficult to form the oxygen absorber into a film, block or tablet form.

The present invention intends to provide an organic oxygen absorber, oxygen absorbent resin composition, and oxygen absorbent film, having the same oxygen absorption capability as the oxygen absorber using iron powder as a reactant, not being detected by a metal detector, presenting little possibility of ignition when heated in a microwave oven, and not containing water.

Means for Solving the Problems

The oxygen absorber of the present invention contains gallic acid and a transition metal compound. The oxygen absorber of the present invention may also contain an alkali carbonate such as potassium carbonate, sodium carbonate, and calcium carbonate, in addition to the gallic acid and a transition metal compound.

The oxygen absorbent resin composition of the present invention includes an oxygen absorber containing gallic acid and a transition metal compound, and a thermoplastic resin. The oxygen absorbent resin composition may further contain an alkali carbonate such as potassium carbonate, sodium carbonate, and calcium carbonate.

The oxygen absorbent resin composition of the present invention is formed variously from an oxygen absorber containing gallic acid and a transition metal compound, and a thermoplastic resin by a method such as extrusion, blow molding, and injection molding. An alkali carbonate may be added to the oxygen absorber and the thermoplastic resin as required.

Advantageous Effect of the Invention

The oxygen absorber of the present invention provides safety and the same oxygen absorption capability as the one using iron powder as a reactant, and need not contain water. Consequently, the oxygen absorber can also be used for dry foods, medicines, pharmaceuticals, cosmetics, electronic parts, and so on, thus covering wide range of application. In addition, a metal detector does not respond to it, and there is no possibility of ignition even if it is heated in a microwave oven.

Furthermore, the oxygen absorbent resin composition of the present invention can be shaped favorably in a desirable form such as a film, block, and tablet. The oxygen absorbent film of the present invention is convenient because it can be integrated into a packaging film.

DETAILED DESCRIPTION OF THE PREFERRED EMBODIMENTS

The present invention will hereinafter be described in detail by referring to the example.

Gallic acid to be used in the oxygen absorber of the present invention is 3,4,5-trihydroxybenzoic acid.

Transition metal compound to be used in the present invention is chemical salts of transition metal ion with inorganic or organic acid, or complexes of transition metal ion with organic compound, wherein the chemical salts and complex compounds include both hydrate and non-hydrate. Transition metals such as Fe, Cu, Mn, V, Cr, Co, Ni, and Zn can be used. Especially, Fe, Cu, or Mn is preferable. The transition metal compound may be a single transition metal compound, or a mixture of two or more transition metal compounds. Specifically, one or more compounds selected from ferric chloride, ferrous sulfate, ferric citrate, ferric stearate, tris (2,4-pentanedionate) iron, copper sulfate, and manganese sulfate, and so on can be used. Iron salts or iron complexes are desirable from the viewpoint of ensuring safety.

The mass ratio of the transition metal to gallic acid should be within the range from 0.001:1 to 10:1, preferably 0.01:1 to 1:1. If the content is less than 0.001, uniform mixing is not allowed, causing ununiformity in oxygen absorption capability, which is undesirable. If the mass ratio of the transition metal compound to gallic acid exceeds 10, the volume of gallic acid in the oxygen absorber becomes insufficient, meaning that desirable oxygen absorption capability cannot be obtained. Furthermore, depending on the type of the transition metal compound used, the oxygen absorber turns to be a pasty, highly viscous, and hard-to-handle liquid tending to attach to containers, bags, and so on, thus causing loss.

The oxygen absorber of the present invention absorbs oxygen relying on the oxygen oxidation reaction of gallic acid which is a substance to be oxidized. The oxygen oxidation reaction is enhanced by the oxidation-reduction function of the transition metal compound used as a catalyst. It is considered that an electron moves from the substance to be oxidized to a transition metal ion first, and then an oxidation reaction is caused. Such a move of one electron also occurs easily in powder state where gallic acid and a transition metal compound are mixed. Consequently, unlike the conventional systems described above, the present invention of the oxygen absorber causes and enhances oxidation reaction of gallic acid without water to activate its oxygen absorption capability.

It is desirable that the oxygen absorber of the present invention further contains an alkali carbonate such as potassium carbonate, sodium carbonate, and calcium carbonate, in addition to gallic acid and a transition metal compound. Alkali carbonates are desirable because they do not have deliquescent property and are inexpensive. It is desirable that the mass ratio of the alkali carbonate to gallic acid is 0.01:1 to 10:1, more preferably 0.5:1 to 1:1, to achieve desirable oxygen absorption capability.

More specifically, oxygen absorber contains gallic acid, a transition metal compound, and an alkali carbonate, wherein the transition metal compound is contained at the mass ratio to the gallic acid within the range of 0.001:1 to 10:1 and, the alkali carbonate is contained at the mass ratio to the gallic acid within the 0.01:1 to 10:1 range. Preferably, the transition metal compound is contained at the mass ratio to the gallic acid within the range of 0.01:1 to 1:1 and, the alkali carbonate is contained at the mass ratio to the gallic acid within the 0.5:1 to 1:1 range.

The oxygen absorber of the present invention can be enclosed in a laminated bag of PET/aluminum foil/polypropylene. The oxygen absorber of the present invention can be sealed in an oxygen-permeable container or package, which is then placed in the laminated bag.

The oxygen absorbent resin composition of the present invention includes an oxygen absorber containing gallic acid and a transition metal compound, and a thermoplastic resin. Also an alkali carbonate may be contained in above mentioned oxygen absorbent resin composition. Transition metal compounds and alkali carbonates are as described above.

The thermoplastic resin used for the present invention is a polystyrene resin, polyester resin, acrylic resin, polyamide resin, polyvinyl alcohol resin, polyurethane resin, polyolefin resin, polycarbonate resin, and polysulfone resin, or a mixture of any one of the above.

The mass ratio of the oxygen absorber to the thermoplastic resin is usually set to fall within the 1:100 to 200:100 range, but not limited to this range.

The oxygen absorbent resin composition of the present invention can be processed into a desirable form such as films, blocks, and tablets. For example, oxygen absorber in powder form can be made into blocks or tablets for ease of handling. In addition, the oxygen absorber can be laminated with a packaging film by the coextrusion or other methods to form a convenient multilayer film usable as a packaging bag having oxygen absorption capability. If the oxygen absorber is made into a multilayer film, the package bag only contains foods, medicine, pharmaceuticals, cosmetics, electronic parts, and so on, which saves the trouble of placing the oxygen absorber into a package bag and also prevents accidental ingestion of the oxygen absorber.

The oxygen absorber of the present invention containing gallic acid, transition metal compound, and alkali carbonate, may further include various additives such as dispersant, coloring agent, and bulking agent.

The present invention will hereinafter be described in detail by referring to the example.

EXAMPLES

A transition metal compound and an alkali carbonate were added to gallic acid of 5 g (shown as 1.0 in mass ratio in Table 1), and mixed quickly in a mortar until particles became fine and uniform. The obtained sample was placed in small quantity into aluminum laminate packaging bags made of laminated multi layer film of nylon/aluminum foil/polyethylene with 0.05 g of gallic acid in each bag. The packaging bags containing the oxygen absorber were then heat-sealed into the shape of a Tetra Pak package so that the volumetric capacity (air volume) of the package bags became 106 mL. After leaving them at room temperature for 14 days, the oxygen concentration in the air in the packaging bag was measured, and the oxygen absorption capability of the oxygen absorber was calculated (Examples 1 to 18).

For comparison, an oxygen absorber containing gallic acid and an alkali carbonate, without adding a transition metal compound, was prepared in the same manner as above described way. The comparative oxygen absorber was then placed into aluminum laminate packaging bags with 106 mL of air as in the same manner as above description, and stored at room temperature for 14 days. The oxygen concentration after the storage was then measured, and the oxygen absorption capability of the comparative oxygen absorber was calculated (comparisons 1 and 2). The aluminum laminate packaging bags did not contain water.

After the packaging bags were stored for 14 days, the oxygen concentration in the bags was measured by inserting a measurement needle of Pack Master-RO-103 (IIJIMA ELECTRONICS CORPORATION), a diaphragm galvanic cell type oxygen analyzer, into the bags, and the oxygen absorption capability per 1 g of gallic acid (mL/g) was calculated. The results are shown in the Table 1.

TABLE 1

| | Substance to be oxidized | Substance name and Mass ratio | | Oxygen absorption capability (mL/g gallic acid) (14 days) |
|---|---|---|---|---|
| | Gallic acid | Alkali | Transition metal compound | |
| Example 1 | 1.0 | 0 | FeCl₃•6H₂O 0.115 | 34.3 |
| Example 2 | 1.0 | K₂CO₃ 0.01 | FeCl₃•6H₂O 0.115 | 41.2 |
| Example 3 | 1.0 | K₂CO₃ 0.5 | FeCl₃•6H₂O 0.115 | 217.3 |
| Example 4 | 1.0 | K₂CO₃ 1.0 | FeCl₃•6H₂O 0.115 | 228.0 |
| Example 5 | 1.0 | K₂CO₃ 5.0 | FeCl₃•6H₂O 0.115 | 48.0 |
| Example 6 | 1.0 | K₂CO₃ 10.0 | FeCl₃•6H₂O 0.115 | 33.4 |
| Example 7 | 1.0 | K₂CO₃ 1.0 | Iron (III) citrate•nH₂O 0.115 | 54.8 |
| Example 8 | 1.0 | K₂CO₃ 1.0 | Iron (III) stearate 0.115 | 60.7 |
| Example 9 | 1.0 | K₂CO₃ 1.0 | Iron (II) sulfate•7H₂O 0.115 | 66.6 |
| Example 10 | 1.0 | K₂CO₃ 1.0 | Tris (2,4-pentanedionate) iron (III) 0.115 | 67.5 |
| Example 11 | 1.0 | K₂CO₃ 0.5 | Copper (II) sulfate•7H₂O 0.05 | 288.3 |
| Example 12 | 1.0 | K₂CO₃ 0.5 | Manganese (II) sulfate•H₂O 0.05 | 316.1 |
| Example 13 | 1.0 | K₂CO₃ 1.0 | FeCl₃•6H₂O 0.001 | 33.4 |
| Example 14 | 1.0 | K₂CO₃ 1.0 | FeCl₃•6H₂O 0.01 | 69.1 |
| Example 15 | 1.0 | K₂CO₃ 1.0 | FeCl₃•6H₂O 1.0 | 167.1 |
| Example 16 | 1.0 | K₂CO₃ 1.0 | FeCl₃•6H₂O 10.0 | 100.4 |
| Example 17 | 1.0 | K₂CO₃ 0.5 | Tris (2,4-pentanedionate) iron (III) 0.1 | 134.0 |
| Example 18 | 1.0 | K₂CO₃ 0.5 | Iron (III) stearate 0.05 | 306.7 |
| Comparative Example 1 | 1.0 | Na₂CO₃ 1.0 | 0 | 0 |
| Comparative Example 2 | 1.0 | K₂CO₃ 1.0 | 0 | 0 |

Examples 1 to 18 show that the oxygen absorber of the present invention is capable of absorbing oxygen without water in the aluminum laminate bag.

It was also found that the mass ratio of the transition metal compound to gallic acid is sufficient for absorbing oxygen within the range from 0.001:1 to 10:1, preferably range from 0.01:1 to 1:1 in the case of iron salt, whereas 0.05:1 is sufficient in the case of copper sulfate or manganese sulfate.

Also the examples show that the amount of oxygen to be absorbed increased in the case oxygen absorber of the present invention contained an alkali carbonate, potassium carbonate. It is sufficient if the mass ratio of the potassium carbonate to gallic acid falls within the range from 0.01:1 to 10:1, preferably range from 0.5:1 to 1:1.

Adequacy Assessment for Forming a Film

As shown in Table 2, a polyethylene resin (NUC powder polyethylene PES-20, Nippon Unicar Company Limited) was blended into the oxygen absorber in dry state as a resin for film formation. Films were formed at 170° C. using T-die of LABO PLASTOMILL (TOYO SEIKI Co., Ltd.), and the oxygen absorption capability of the films was measured. The film was cut into small pieces and placed in the aluminum laminate packaging bags along with air of 106 mL. The bags were stored at room temperature for 30 days, and then the oxygen concentration was measured and the absorption capability of the film was calculated. It was impossible to form a film from the conventional oxygen absorber wherein gallic acid turns into an aqueous solution because it contained too much water.

TABLE 2

| | Oxygen absorber (Name of substance and Mass ratio) | | | | Oxygen absorption capability (mL/cm²) (30 days) |
|---|---|---|---|---|---|
| | Oxidized substance | Alkali | Iron compound | Resin | |
| Example 17 | Gallic acid 1.0 | K₂CO₃ 0.5 | Tris (2,4-pentanedionate) iron (III) 0.1 | Polyethylene 24.7 | 0.074 |
| Example 18 | Gallic acid 1.0 | K₂CO₃ 0.5 | Iron (II) stearate 0.05 | Polyethylene 13.5 | 0.073 |

Table 2 shows that the thin layer film made from the mixture of the oxygen absorber of the present invention and a thermoplastic resin also has oxygen absorption capability. In the Table 2, mL/cm² was used for unit for measuring oxygen absorption capability. The inventors regarded that the film had oxygen absorption capability if the value was 0.01 mL/cm² (30 days) or higher.

As a test for the feasibility of forming materials into a film, the oxygen absorber of the example 4 and a polyethylene resin (NUC powder polyethylene PES-20, Nippon Unicar Company Limited) were blended in dry state at the mass ratio of 1:1 (oxygen absorption capability was not measured). The obtained resin mixture was successfully made into a film at 170° C. using T-die of LABO PLASTOMILL (TOYO SEIKI Co., Ltd.)

What is claimed is:

1. An oxygen absorber consisting of: gallic acid, an alkali carbonate and at least one transition metal compound selected from the group consisting of ferric chloride, ferric citrate, ferric stearate, tris (2,4-pentanedionate) iron, and manganese sulfate, wherein the transition metal compound is contained at the mass ratio to the gallic acid within the range of 0.001:1 to 10:1 and, the alkali carbonate is contained at the mass ratio to the gallic acid within the 0.01:1 to 10:1 range.

2. The oxygen absorber according to claim 1, wherein the transition metal compound is contained at the mass ratio to the gallic acid within the range of 0.01:1 to 1:1 and, the alkali carbonate is contained at the mass ratio to the gallic acid within the 0.5:1 to 1:1 range.

3. The oxygen absorber according to claim 1, wherein the oxygen absorber does not contain water.

4. The oxygen absorber according to claim 1, wherein the gallic acid is a substance being oxidized, and the transition metal compound being a catalyst.

5. An oxygen absorbent resin composition comprising: the oxygen absorber according to claim 1 and a thermoplastic resin.

6. An oxygen absorbent film comprising: a thin layer made of the oxygen absorber according to claim 1 and a thermoplastic resin.

7. A multi-layered film comprising: a packing film, and a thin layer made of the oxygen absorber according to claim 1 and a thermoplastic resin.

* * * * *